(12) United States Patent
Fujita

(10) Patent No.: US 12,561,966 B2
(45) Date of Patent: Feb. 24, 2026

(54) LEARNING APPARATUS, RECOGNITION APPARATUS, LEARNING METHOD, AND STORAGE MEDIUM

(71) Applicant: CANON KABUSHIKI KAISHA, Tokyo (JP)

(72) Inventor: Erika Fujita, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 308 days.

(21) Appl. No.: 18/191,758

(22) Filed: Mar. 28, 2023

(65) Prior Publication Data

US 2023/0334843 A1 Oct. 19, 2023

(30) Foreign Application Priority Data

Apr. 14, 2022 (JP) ................................. 2022-066963

(51) Int. Cl.
*G06V 10/82* (2022.01)
*G06V 10/776* (2022.01)

(52) U.S. Cl.
CPC ............ *G06V 10/82* (2022.01); *G06V 10/776* (2022.01)

(58) Field of Classification Search
CPC .............................. G06V 10/776; G06V 10/82
See application file for complete search history.

(56) References Cited

U.S. PATENT DOCUMENTS

| | | | | | |
|---|---|---|---|---|---|
| 11,562,287 | B2 * | 1/2023 | Xiong | ................... | G06F 9/4881 |
| 2018/0293498 | A1 * | 10/2018 | Campos | ................. | G06N 3/082 |

| | | | | | |
|---|---|---|---|---|---|
| 2019/0073560 | A1 * | 3/2019 | Matei | .................. | G06F 18/2113 |
| 2019/0101919 | A1 * | 4/2019 | Kobilarov | ....... | B60W 30/18154 |
| 2020/0082056 | A1 * | 3/2020 | Hasegawa | ............ | G06N 3/0464 |
| 2020/0193296 | A1 * | 6/2020 | Dixit | ...................... | G06N 20/10 |
| 2020/0210768 | A1 * | 7/2020 | Turkelson | ............. | G06T 7/0002 |
| 2020/0225655 | A1 * | 7/2020 | Cella | ............... | G05B 19/41865 |
| 2020/0348662 | A1 * | 11/2020 | Cella | ...................... | G06N 3/084 |
| 2021/0027222 | A1 * | 1/2021 | Rando | .................... | G06N 20/00 |
| 2021/0089922 | A1 * | 3/2021 | Lu | ............................ | G06N 3/04 |
| 2021/0150357 | A1 * | 5/2021 | Karras | ................. | G06N 3/0475 |
| 2021/0150369 | A1 * | 5/2021 | Karras | .................. | G06V 10/82 |
| 2021/0324561 | A1 * | 10/2021 | Kim | .................. | G06F 18/2148 |
| 2022/0012741 | A1 * | 1/2022 | Raj | .................... | G06Q 20/4016 |
| 2022/0027792 | A1 * | 1/2022 | Cummings | ............ | G06N 3/045 |

OTHER PUBLICATIONS

Syed Shakib Sarwar et al. , "Incremental Learning in Deep Convolutional Neural Networks Using Partial Network Sharing," Jan. 8, 2020, IEEEAccess, vol. 8,2020, pp. 4615-4626.*

(Continued)

*Primary Examiner* — Omar S Ismail

(74) *Attorney, Agent, or Firm* — Canon U.S.A., Inc. IP Division

(57) ABSTRACT

A learning apparatus is provided that trains a model while a feature amount of a trained model is held at a learning early stage. When a model is trained using a parameter of the trained model, the model is trained by adding a task, and mixing a value for the added task and preliminarily prepared supervisory data at a predetermined mixing ratio. An intermediate layer to be trained is extended toward a low-dimensional layer side based on training progress with a layer for solving the added task as a starting point.

11 Claims, 14 Drawing Sheets

(56) References Cited

OTHER PUBLICATIONS

Anamika Dhillon et al.,"Convolutional neural network: a review of models, methodologies and applications to object detection," Dec. 28, 2019, Progress in Artificial Intelligence (2020) 9, pp. 85-106.*

Ronan Collobert et al.,"A Unified Architecture for Natural Language Processing: Deep Neural Networks with Multitask Learning," Jul. 5, 2008, Appearing in Proceedings of the 25 th International Conference on Machine Learning, Helsinki, Finland, 2008, pp. 160-164.*

Junting Zhang et al.,"Class-incremental Learning via Deep Model Consolidation," Mar. 2020, Proceedings of the IEEE/CVF Winter Conference on Applications of Computer Vision (WACV), 2020, pp. 1131-1137.*

Geoffrey Hinton et al.,"Distilling the Knowledge in a Neural Network," Mar. 9, 2015, Machine Learning, arXiv:1503.02531, pp. 1-7.*

Meng Gan et al.,"Construction of hierarchical diagnosis network based on deep learning and its application in the fault pattern recognition of rolling element bearings," Nov. 30, 2015, Mechanical Systems and Signal Processing 72-73(2016),pp. 93-100.*

Sijin Li et al.,"Heterogeneous Multi-task Learning for Human Pose Estimation with Deep Convolutional Neural Network," Jun. 2014, Proceedings of the IEEE Conference on Computer Vision and Pattern Recognition (CVPR) Workshops, 2014, p. 482-487.*

Priyadarshini Panda et al.,"Unsupervised Regenerative Learning of Hierarchical Features in Spiking Deep Networks for Object," Nov. 3, 2016, 2016 International Joint Conference on Neural Networks (IJCNN), pp. 299-304.*

Zhicheng Yan et al.,"HD-CNN: Hierarchical Deep Convolutional Neural Networks for Large Scale Visual Recognition," Dec. 2015, Proceedings of the IEEE International Conference on Computer Vision (ICCV), 2015, pp. 2740-2746.*

Francesco Donnarumma et al.,"Learning programs is better than learning dynamics: a programmable neural network hierarchical architecture in a multi-task scenario,"Oct. 9, 2016, Adaptive Behavior 2016, vol. 24(1), pp. 27-35.*

Barret Zoph et al.,"Learning Transferable Architectures for Scalable Image Recognition," Jun. 2018, Proceedings of the IEEE Conference on Computer Vision and Pattern Recognition (CVPR), 2018, pp. 8697-8703.*

Qiang Bai et al.,"Object Detection Recognition and Robot Grasping Based on Machine Learning: a Survey," Oct. 15, 2020, IEEEAccess, vol. 8,2020, pp. 181855-181871.*

Ming Liang et al.,"Recurrent Convolutional Neural Network for Object Recognition," Jun. 2015, Proceedings of the IEEE Conference on Computer Vision and Pattern Recognition (CVPR), 2015, pp. 3367-3371.*

Collobert, R., et al., "A Unified Architecture for Natural Language Processing: Deep Neural Networks with Multitask Learning", Proceedings of the 25 th International Conference on Machine Learning, 2008.

Hinton, G., et al., "Distilling the Knowledge in a Neural Network", Mar. 9, 2015, pp. 1-9.

Zhang, J., et al., "Class-incremental Learning via Deep Model Consolidation", Computer Vision Foundation, 2020, pp. 1131-1140.

* cited by examiner

Figures 2A, 2B:
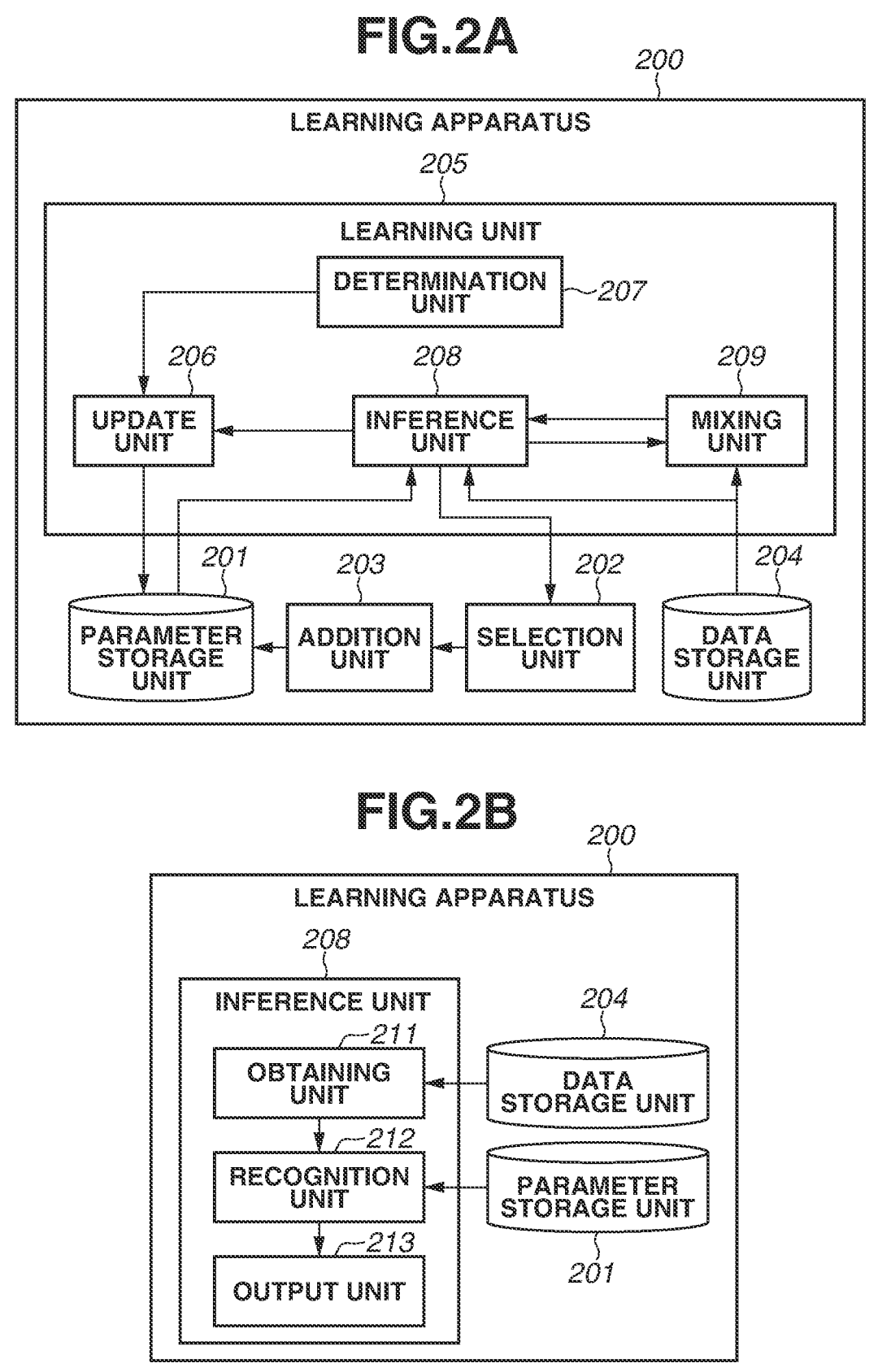

LEARNING APPARATUS

*205*

LEARNING UNIT

DETERMINATION UNIT — *207*

*206*     *208*     *209*

UPDATE UNIT ← INFERENCE UNIT → MIXING UNIT

*201*    *203*    *202*    *204*

PARAMETER STORAGE UNIT ← ADDITION UNIT ← SELECTION UNIT    DATA STORAGE UNIT

LEARNING APPARATUS

*208*

INFERENCE UNIT

*211*

OBTAINING UNIT ← DATA STORAGE UNIT   *204*

*212*

RECOGNITION UNIT ← PARAMETER STORAGE UNIT

*213*

OUTPUT UNIT

*201*

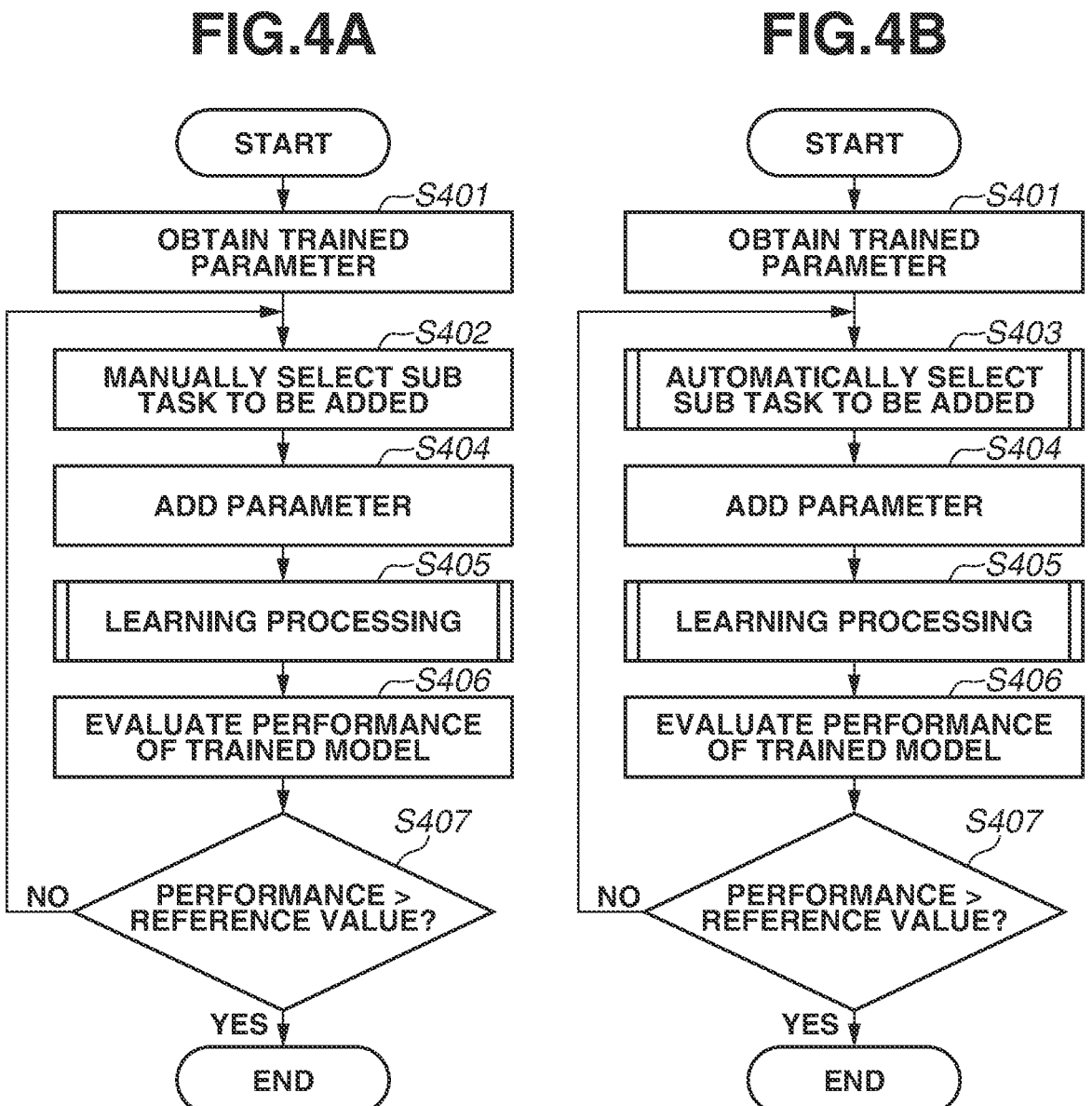

FIG.4A

START

↓ ~S401

OBTAIN TRAINED PARAMETER

↓ ~S402

MANUALLY SELECT SUB TASK TO BE ADDED

↓ ~S404

ADD PARAMETER

↓ ~S405

LEARNING PROCESSING

↓ ~S406

EVALUATE PERFORMANCE OF TRAINED MODEL

↓

S407

PERFORMANCE > REFERENCE VALUE?

NO

YES ↓

END

FIG.4B

START

↓ ~S401

OBTAIN TRAINED PARAMETER

↓ ~S403

AUTOMATICALLY SELECT SUB TASK TO BE ADDED

↓ ~S404

ADD PARAMETER

↓ ~S405

LEARNING PROCESSING

↓ ~S406

EVALUATE PERFORMANCE OF TRAINED MODEL

↓

S407

PERFORMANCE > REFERENCE VALUE?

NO

YES ↓

END

FIG.7A

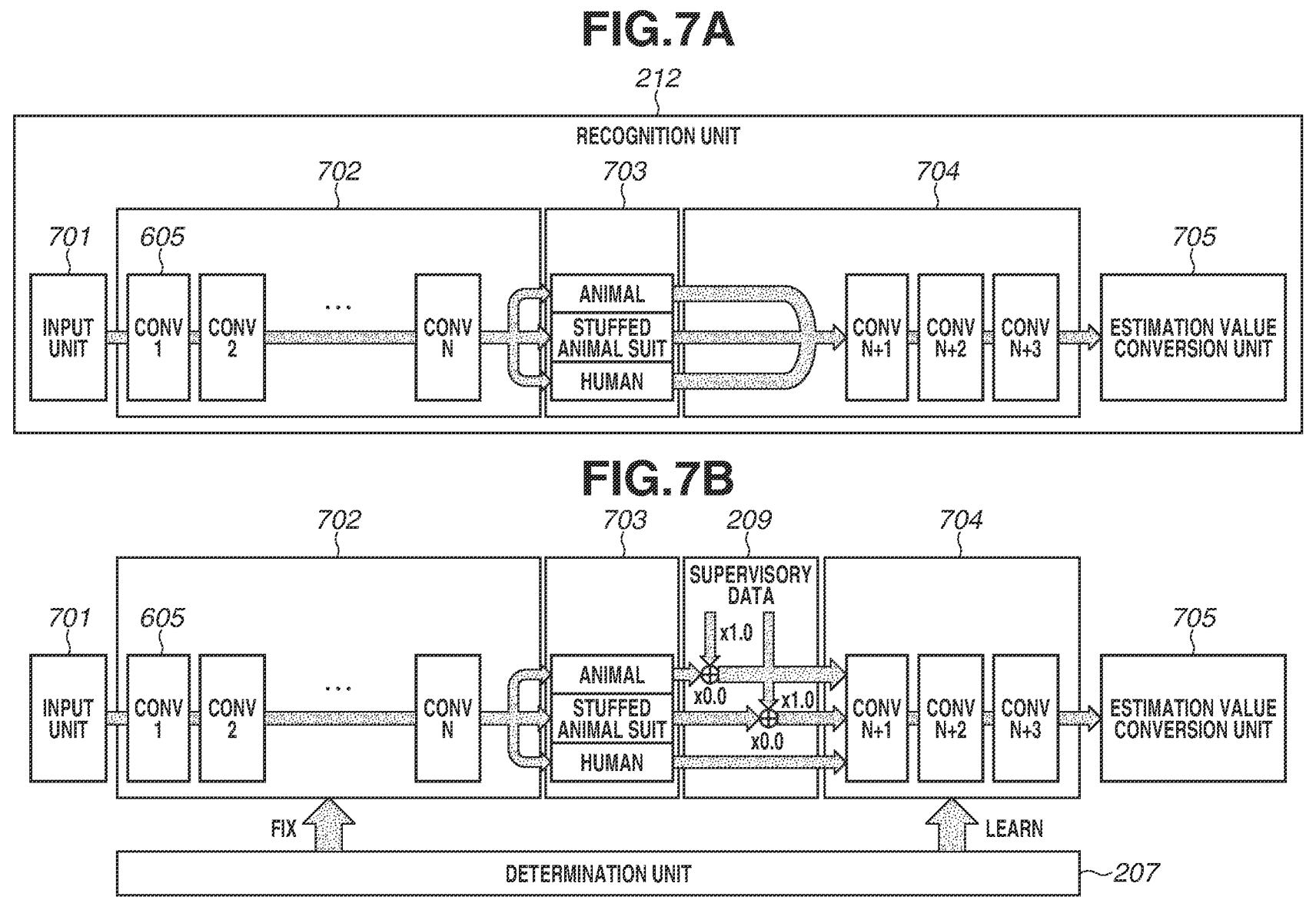

212 — RECOGNITION UNIT

701 — INPUT UNIT

605

702

CONV 1
CONV 2
...
CONV N

703

ANIMAL
STUFFED ANIMAL SUIT
HUMAN

704

CONV N+1
CONV N+2
CONV N+3

705 — ESTIMATION VALUE CONVERSION UNIT

FIG.7B

701 — INPUT UNIT

605

702

CONV 1
CONV 2
...
CONV N

703

ANIMAL
STUFFED ANIMAL SUIT
HUMAN

209 — SUPERVISORY DATA x1.0
x0.0
x1.0
x0.0
x0.0

704

CONV N+1
CONV N+2
CONV N+3

705 — ESTIMATION VALUE CONVERSION UNIT

207

LEARN

FIX

DETERMINATION UNIT

FIG.8B
*802*
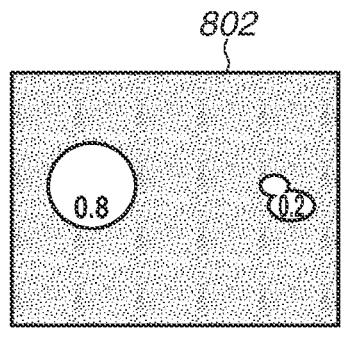
*803*
FIG.8A
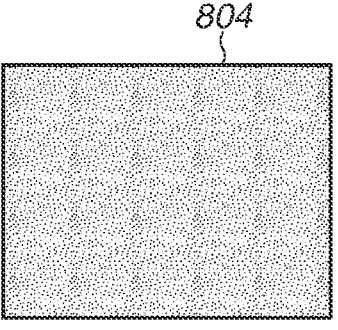
FIG.8C
*801*
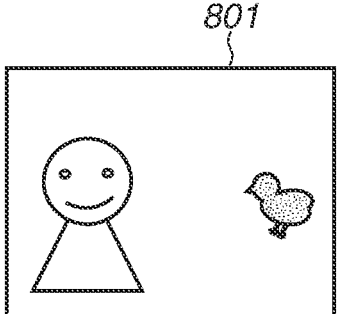
*804*
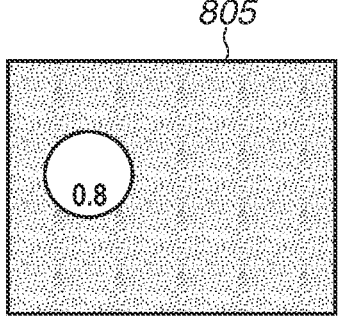
*805*

FIG.9B

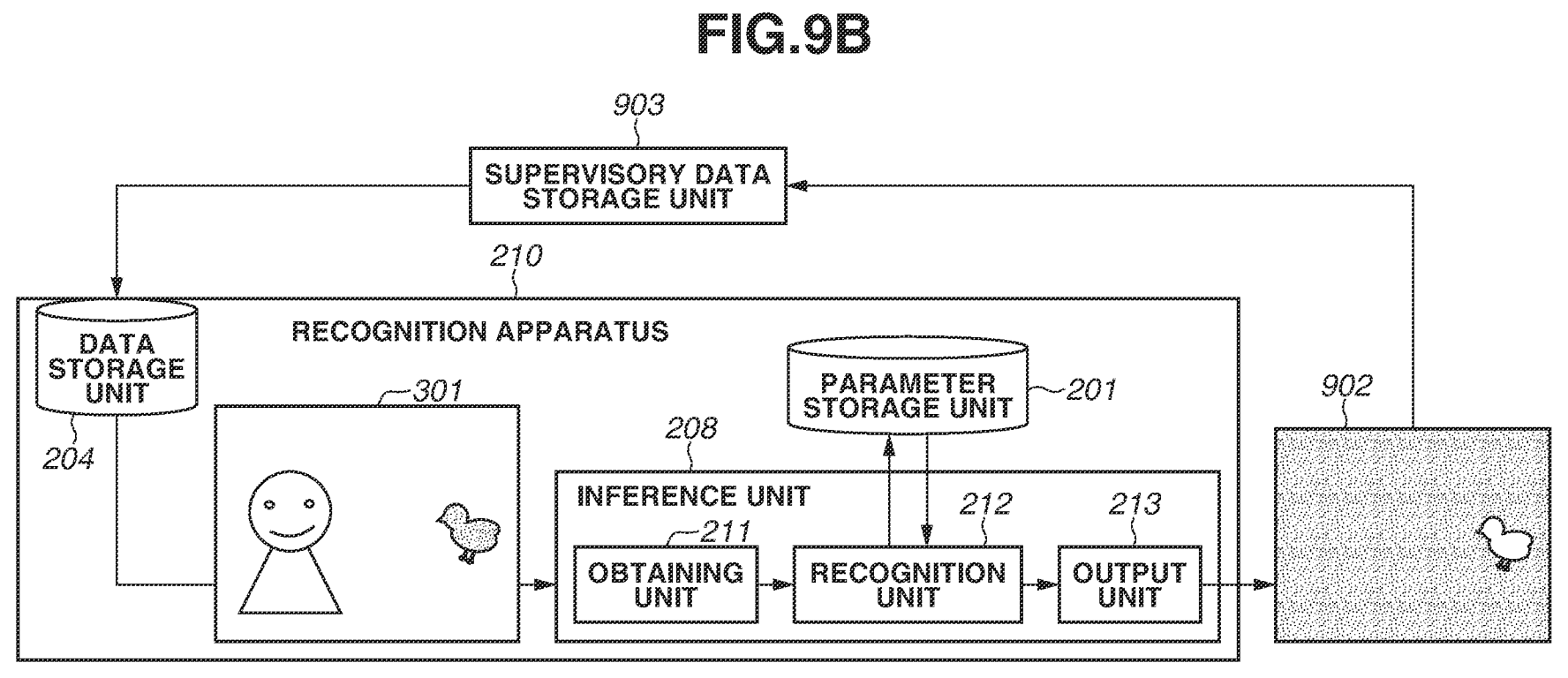

903 — SUPERVISORY DATA STORAGE UNIT

210 — RECOGNITION APPARATUS

902

208 — INFERENCE UNIT

211 — OBTAINING UNIT

212 — RECOGNITION UNIT

213 — OUTPUT UNIT

201 — PARAMETER STORAGE UNIT

301

204 — DATA STORAGE UNIT

LEARNING APPARATUS, RECOGNITION APPARATUS, LEARNING METHOD, AND STORAGE MEDIUM

BACKGROUND

Field

The present disclosure relates to a learning apparatus, a recognition apparatus, a learning method, and a storage medium.

Description of the Related Art

Recently, models based on a machine learning technology have been put into practical use. Among these models, models using a neural network have been put into practical use.

While many methods for realizing high-accuracy models have been proposed, a method for deducing a configuration and a combination of recognition tasks to be solved to obtain a high-accuracy models at a stage before learning has not been established.

In order to realize a practically usable high-accuracy model, there is a case where whether a separation exists between an estimation result obtained by inputting data in a trained model, and ground truth data, which is an ideal output, is checked, and if the separation exists, the input data and the output of the trained model are analyzed to take measures.

As a result of the analysis, in a case where the separation between the estimation result and the ground truth data is caused by the trained model being unable to obtain a feature amount effective for recognition, it is conceivable that the separation is reduced by reviewing the configuration of the trained model so as to be able to learn the feature amount effective for recognition to improve the accuracy of the model.

"R. Collobert and J. Weston, A unified architecture for natural language processing, Proceedings of the 25th international conference on Machine learning, 20(1):150-167, 2008." discusses a method for improving a generalization performance without falling into a localized solution, by simultaneously learning a plurality of tasks to obtain a generic feature amount of each task.

However, to learn a model efficiently, it is necessary to preliminarily set a task to be solved by a model at a time of an initial state of learning. With this method, if the model configuration is changed and a new task is added, the learning is to be performed after initializing parameters concerning the task to be added with a random number. In this case, at an early stage of the learning, the parameters concerning the added task are largely updated and the feature amount of the trained task cannot be held.

To solve this issue, "J. Zhang et al. Class-incremental Learning via Deep Model Consolidation, arXiv:1903.07864, 2019." discusses a method of integrating two trained models using a distillation method discussed in "G. Hinton, O. Vinyals, J. Dean, Distillation the Knowledge in a Neural Network, Neural Information Processing Systems, 2014.". With this method, it is reported that a task to be recognized can be flexibly added, and the generalization performance can be improved.

The method discussed in "J. Zhang et al. Class-incremental Learning via Deep Model Consolidation, arXiv: 1903.07864, 2019." trains the whole model so as to increase the recognition accuracy of all the tasks to be solved using two trained models. Accordingly, in a case where the task to be added is used only as auxiliary information for the trained task to improve the accuracy of the trained task, there may be a case that the method is not necessarily optimum. For example, in a case where a model dedicated to a specific task is to be trained, the effect of the method discussed in "J. Zhang et al. Class-incremental Learning via Deep Model Consolidation, arXiv:1903.07864, 2019." becomes low, if the recognition accuracy of the trained model is low for the specific task desired to have a high-accuracy.

SUMMARY

According to an aspect of the present disclosure, a learning apparatus includes a memory storing instructions, and a processor that, upon execution of the stored instructions, is configured to operate as: an addition unit configured to add a task to a trained model having a hierarchical configuration, a mixing unit configured to mix, at a predetermined mixing ratio, an estimation value for the added task, and supervisory data for the added task or a predetermined value obtained from data generated based on the trained model, and an update unit configured to update a parameter of the trained model using an estimation value in which the predetermined value is mixed by the mixing unit.

Further features of the present disclosure will become apparent from the following description of exemplary embodiments with reference to the attached drawings.

BRIEF DESCRIPTION OF THE DRAWINGS

FIGS. 2A and 2B are block diagrams illustrating an example of a functional configuration of the learning apparatus according to the first exemplary embodiment.

FIG. 4A is a flowchart illustrating a processing procedure of the learning apparatus according to the first exemplary embodiment, and FIG. 4B is a flowchart illustrating a processing procedure of a learning apparatus according to second and fourth exemplary embodiments.

FIGS. 7A to 7D are diagrams illustrating a transition of learning settings according to the first exemplary embodiment.

FIGS. 8A to 8C are diagrams illustrating an input and outputs of an inference unit according to the second exemplary embodiment.

FIGS. 9A and 9B are block diagrams illustrating an example of a functional configuration of a learning apparatus according to a third exemplary embodiment.

DESCRIPTION OF THE EMBODIMENTS

The present disclosure relates to a method of adding and learning a recognition task to be solved by a trained model, to improve the accuracy of a neural network having a hierarchical configuration. Hereinbelow, exemplary embodiments to which the present disclosure is applied will be described.

In the descriptions below, a recognition task to be eventually solved by a model is referred to as a main task, and a recognition task to be solved on the way of learning the model is referred to as an auxiliary task (hereinbelow, referred to as a sub task). In a first exemplary embodiment, the main task is to extract a "face" region. In addition, it is assumed that a trained model for estimating a human region including a face is prepared in advance.

In the present exemplary embodiment, a description will be given of a method of adding and learning recognition tasks of extracting a "stuffed animal suit" region and an "animal" region each as a sub task, for the purpose of suppressing an excessive detection that estimates regions other than a "face" to be a "face", in a case where a trained model for estimating a "human" region is used to estimate a "face" region.

However, the recognition task to which the present disclosure is applicable is not limited to the combination described above. For example, in a case where a trained model to estimate a "face" region is used, if there are many undetected cases of not estimating a "face with a mask" region as a "face" region, a recognition task of extracting a "face with a mask" region may be added as a sub task. Hereinbelow, the excessive detection case and the undetected case are integrally referred to as a false recognition.

Figure 11A:
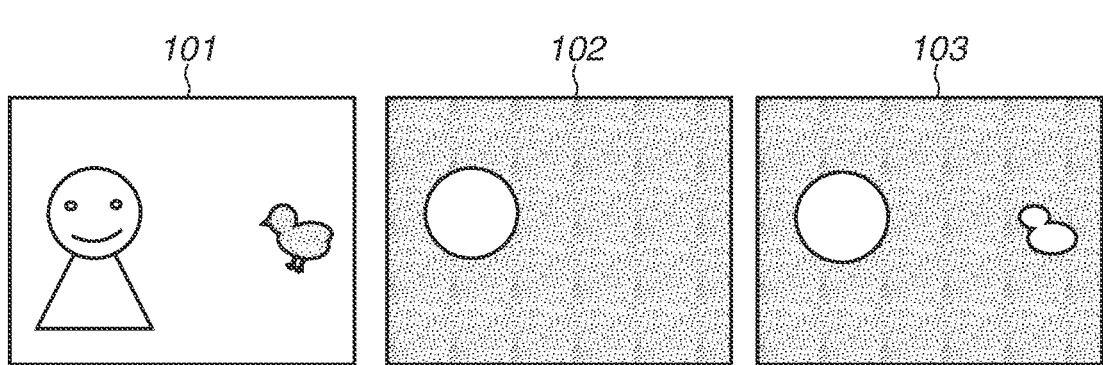
FIGS. 11A and 11B are diagrams each illustrating a false recognition case, according to the first exemplary embodiment.
Figure 11B:
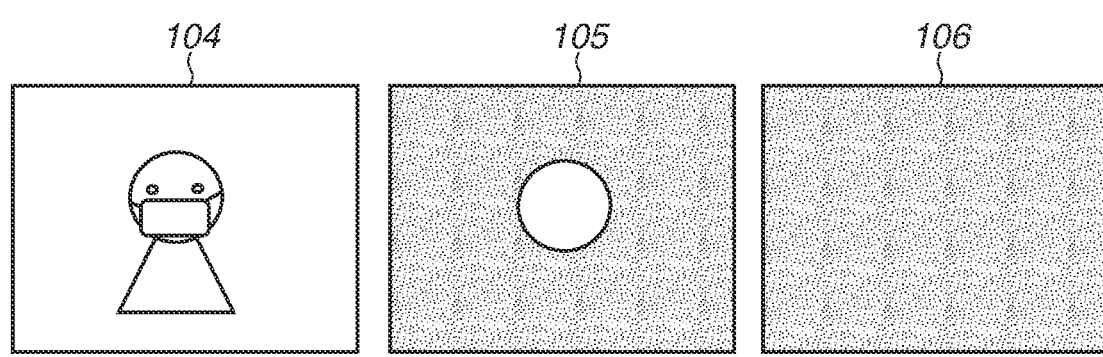

With reference to FIGS. 11A and 11B, specific examples of the false recognition will be described. An excessive detection case will be described with reference to FIG. 11A, and an undetected case will be described with reference to FIG. 11B.

First, FIG. 11A will be described. Input data 101 is recognition target data, and supervisory data 102 is data indicating an ideal ground truth for a task to extract a "face" region with respect to the input data 101. An estimation result 103 is an estimation result of a "face" region when the input data 101 is input to a trained model. Each of white regions indicates the estimation result of the "face" region, which is the same in the description below. The estimation result 103 indicates that a region that is not a "face" region in the supervisory data 102 is estimated as a "face" region. That is an excessive detection.

Next, FIG. 11B will be described. Input data 104 is recognition target data, and supervisory data 105 is data indicating an ideal ground truth for a task to extract a "face" region of the input data 104. An estimation result 106 is an estimation result of a "face" region when the input data 104 is input to a trained model. The estimation result 106 indicates that a "face" region in the supervisory data 105 is estimated as a region other than the "face" region. That is an undetected case.

Figure 1:
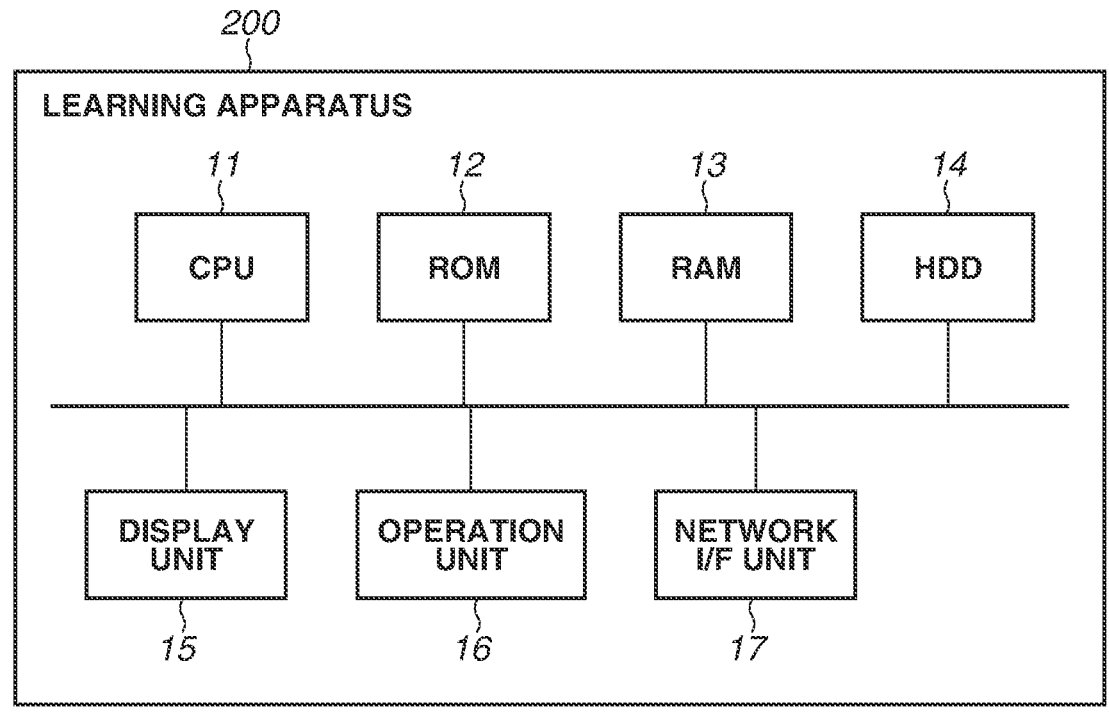
FIG. 1 is a block diagram illustrating a hardware configuration of a learning apparatus according to a first exemplary embodiment.

Next, with reference to FIG. 1, a hardware configuration of a learning apparatus 200 according to the present exemplary embodiment will be described.

The learning apparatus 200 includes, as the hardware configuration, a central processing unit (CPU) 11, a read-only memory (ROM) 12, a random access memory (RAM) 13, a hard disk drive (HDD) 14, a display unit 15, an operation unit 16, and a network interface (I/F) unit 17.

The CPU 11 reads a control program stored in the ROM 12, and executes various kinds of processing. The RAM 13 is used as a main memory for the CPU 11, and as a temporary storage area such as a work area. The HDD 14 stores various kinds of data and various kinds of programs.

The display unit 15 displays various kinds of information. The operation unit 16 includes a keyboard and a mouse to receive various kinds of operations from a user.

The network I/F unit 17 performs communication processing with an external apparatus via a network. Further, as another example, the network I/F unit 17 may wirelessly communicate with an external apparatus.

In addition, functions of and processing of the learning apparatus 200, which will be described below, are implemented by the CPU 11 reading a program stored in the ROM 12 or the HDD 14 and executing the read program. Further, as another example, the CPU 11 may read a program stored in a recording medium such as a secure digital (SD) card, instead of the ROM 12.

Next, with reference to FIGS. 2A and 2B, a functional configuration example of the learning apparatus 200 according to the present exemplary embodiment will be described. FIG. 2A is block diagram illustrating the functional configuration example of the learning apparatus 200, and FIG. 2B is a block diagram illustrating a configuration example of an inference unit 208 of the learning apparatus 200.

As illustrated in FIG. 2A, the learning apparatus 200 includes a parameter storage unit 201, a selection unit 202, an addition unit 203, a data storage unit 204, and a learning unit 205.

The parameter storage unit 201 stores parameters required for recognition, such as filters of convolution layers of a convolutional neural network, weight coefficients, and constant terms.

The selection unit 202 selects a sub task to be added.

The addition unit 203 adds the sub task selected by the selection unit 202.

The data storage unit 204 stores learning data.

Figure 3:
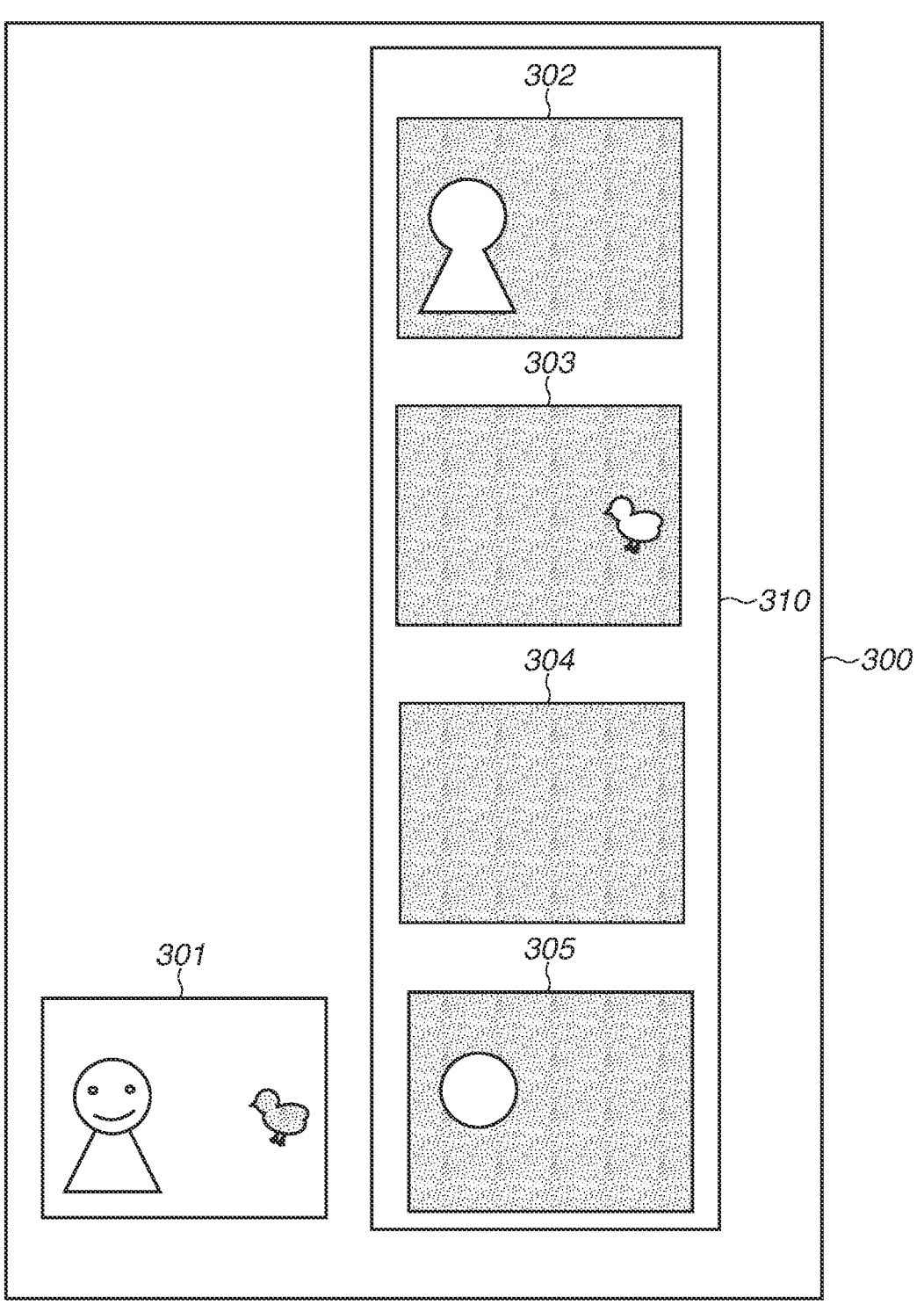
FIG. 3 is a diagram illustrating learning data according to the first exemplary embodiment.

Now, with reference to FIG. 3, a configuration of the learning data used in the present exemplary embodiment will be described.

Learning data 300 includes input data 301 that is a recognition target, and supervisory data 310 indicating ground truths of the recognition task for the input data 301. Pieces of supervisory data 302 to 305 in FIG. 3 are respective pieces of data indicating ideal ground truths for a "human" region, an "animal" region, a "stuffed animal suit" region, and a "face" region for the input data 301.

In the present exemplary embodiment, the learning apparatus 200 trains a model using a data set including a predetermined number of pieces of learning data prepared by a user in advance.

Referring back to FIGS. 2A and 2B, using the learning data stored in the data storage unit 204, the learning unit 205 updates the parameters stored in the parameter storage unit 201. The learning unit 205 further includes an update unit 206, a determination unit 207, the inference unit 208, and a mixing unit 209.

The determination unit 207 determines a parameter to be updated from among the parameters stored in the parameter storage unit 201.

The update unit 206 updates the parameter determined by the determination unit 207, and stores the updated parameter in the parameter storage unit 201.

The mixing unit 209 mixes a predetermined value to an estimation value of the sub task at a certain mixing ratio.

The inference unit 208 outputs an estimation result for the input, based on the value stored in the parameter storage unit 201.

As illustrated in FIG. 2B, the inference unit 208 further includes an obtaining unit 211, a recognition unit 212, and an output unit 213 for outputting an estimation result of the recognition unit 212. In addition, the inference unit 208 can function as a recognition apparatus independent from the learning apparatus 200, if the inference unit 208 can refer to the parameter storage unit 201. For example, a recognition apparatus independent from the learning apparatus 200 can copy the parameters stored in the parameter storage unit 201 to the recognition apparatus to execute the processing of the inference unit 208.

The obtaining unit 211 obtains the learning data from the data storage unit 204, and outputs the input data to the recognition unit 212. In addition, the obtaining unit 211 may obtain only the recognition target data corresponding to the input data from the data storage unit 204, and may output the obtained data to the recognition unit 212.

The recognition unit 212 obtains the parameters from the parameter storage unit 201 to solve the main task.

Here, with reference to FIG. 6A, a neural network used for the processing by the recognition unit 212 will be described.

A neural network 601 is a neural network including a plurality of convolution layers. A convolution layer 605 is an example of one of the convolution layers to perform convolution processing, pooling processing, and normalization processing.

The plurality of convolution layers constituting the neural network 601 is classified into following configurations based on functions thereof. The configurations include an intermediate representation unit 702, a sub task obtaining unit 703, and an integration unit 704. The intermediate representation unit 702 receives the input data 301 from the obtaining unit 211, and obtains an intermediate representation. The sub task obtaining unit 703 estimates the sub task from the intermediate representation. The integration unit 704 estimates an estimation value (posterior probability) of the main task, based on the estimation result of the sub task. In this case, assume that a recognition task for extracting a "human" region is set as a sub task of the neural network 601, as an initial setting. The sub task obtaining unit 703 obtains the estimation value for each sub task based on the intermediate representation obtained by each layer of the intermediate representation unit 702.

Figures 6A, 6B, 6C, 6D:
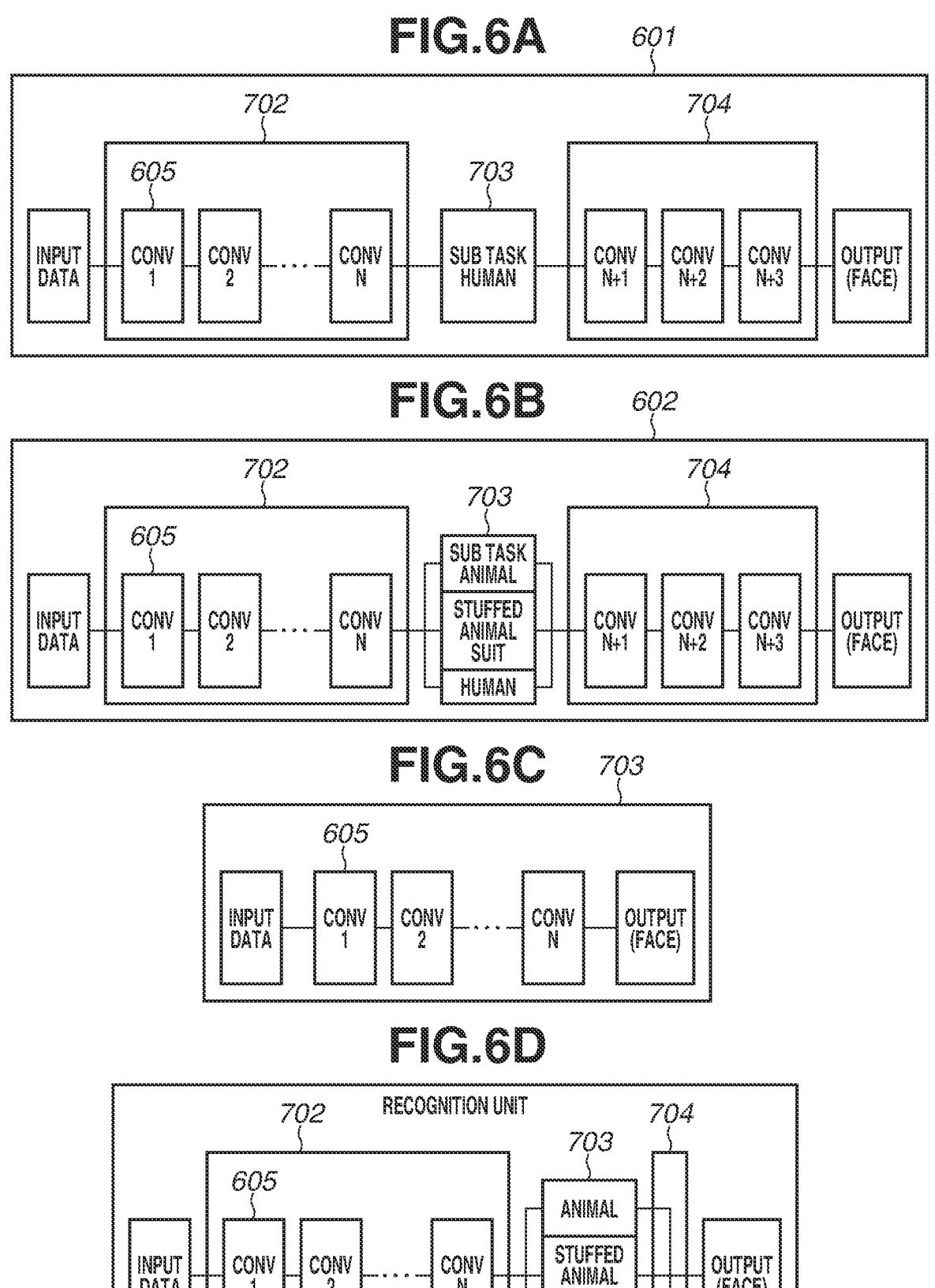
FIGS. 6A to 6E are diagrams each illustrating a neural network according to the first exemplary embodiment or a second exemplary embodiment.

A neural network 602 in FIG. 6B is a neural network obtained after layers for estimating the recognition tasks of extracting an "animal" region and a "stuffed animal suit" region are added to the neural network 601 by the processing of the addition unit 203. The processing performed by the addition unit 203 will be described in detail below.

The recognition unit 212 obtains parameters for the neural network 602 set as described above from the parameter storage unit 201. Now, with reference to FIG. 7A, a description will be given of a configuration example of the recognition unit 212 set by reading parameters for the neural network 602.

The recognition unit 212 includes an input unit 701, the intermediate representation unit 702, the sub task obtaining unit 703, the integration unit 704, and an estimation value conversion unit 705. The configurations of the intermediate representation unit 702, the sub task obtaining unit 703, and the integration unit 704 are determined by the parameters read from the parameter storage unit 201.

The obtaining unit 211 obtains input data of the recognition target of the main task from the data storage unit 204. The input data obtained by the obtaining unit 211 is transmitted to the intermediate representation unit 702 via the input unit 701 of the recognition unit 212. The posterior probability, which is an estimation value for the main task obtained via the intermediate representation unit 702, the sub task obtaining unit 703, and the integration unit 704, is output to the estimation value conversion unit 705.

The estimation value conversion unit 705 converts the estimation value for the main task into a predetermined format, and outputs the converted estimation value to the output unit 213, as a final estimation result. For example, the estimation value conversion unit 705 performs binarization processing on the posterior probability that is the estimation value for the main task to determine whether the estimation value for the main task is a recognition target, based on a threshold, converts the result into a label, and outputs the converted label to the output unit 213 as the final estimation result of the main task. In addition, the estimation value for the main task obtained by the integration unit 704 may be determined to be the final estimation result as it is.

Next, with reference to a flowchart in FIG. 4A, an example of a processing procedure of the learning apparatus 200 according to the present exemplary embodiment will be described. The processing of the flowchart in FIG. 4A starts when a learning start instruction is given.

First, in step S401, the CPU 11 obtains trained parameters required for solving a predetermined recognition task, and stores the trained parameters in the parameter storage unit 201. In the description of the present exemplary embodiment, assume that the parameters are parameters for the neural network in which the main task is set to the "face" region extraction, and the sub task is set to the "human" region extraction, as described with reference to FIG. 6A. The trained parameters are obtained by a method of, for example, subjecting the neural network having such a configuration to learning, or downloading trained parameters open on the web.

In step S402, the inference unit 208 performs estimation processing using the trained parameters obtained by the CPU 11. Then, the selection unit 202 selects a sub task to be added in response to a user's operation based on the estimation result of the inference unit 208. In the present exemplary embodiment, a description will be given of a case where the purpose is to reduce the number of excessive detection cases of detecting a "stuffed animal suit" region or an "animal" region many times as an estimation result, for a detection task of a "human" region. In such a case, the selection unit 202 selects, as a sub task to be added, a detection task of the "stuffed animal suit" region or the "animal" region.

However, the sub task to be added is not limited to the sub task for solving the excessive detection cases as described above. The present disclosure similarly exerts an effect on undetected cases. For example, in a case where there are many undetected cases of the "face with a mask" region, an extraction task of the "face with a mask" region may be added and trained.

Further, even if the sub task is not for false recognition cases of the main task, the effect of the present disclosure can be expected. For example, there is a case where the main task and the sub task have an inclusion relationship. In a case where the main task is a "car" region extraction task, by adding a "vehicle" region extraction task, which is a category including a car, as a sub task, since the "car" region can be recognized using a global characteristic as the "vehicle", a high effect can be expected. For the same reason, in a case where the main task is a "vehicle" region extraction task, when a sub task to be added is set to a "car" region extraction task, a high effect can be expected.

In step S404, the addition unit 203 adds parameters required for solving the sub task selected by the selection unit 202 to the trained parameters stored in the parameter storage unit 201, and stores the parameters in the parameter storage unit 201. Hereinbelow, an example of the processing flow will be described.

First, the CPU 11 obtains trained parameters from the parameter storage unit 201. In this example, as described above with reference to the processing in step S401, a description will be given of a trained neural network with the configuration of the neural network 601 in FIG. 6A, as an example. A "human" region extraction task is assigned to the sub task obtaining unit 703 of the trained neural network 601, as a sub task. By assigning to the sub task obtaining unit 703 the "stuffed animal suit" region extraction task and the "animal" region extraction task, which are the sub tasks selected by the selection unit 202, the neural network 602 with a different configuration of the sub task obtaining unit 703 can be obtained.

Figure 6E:
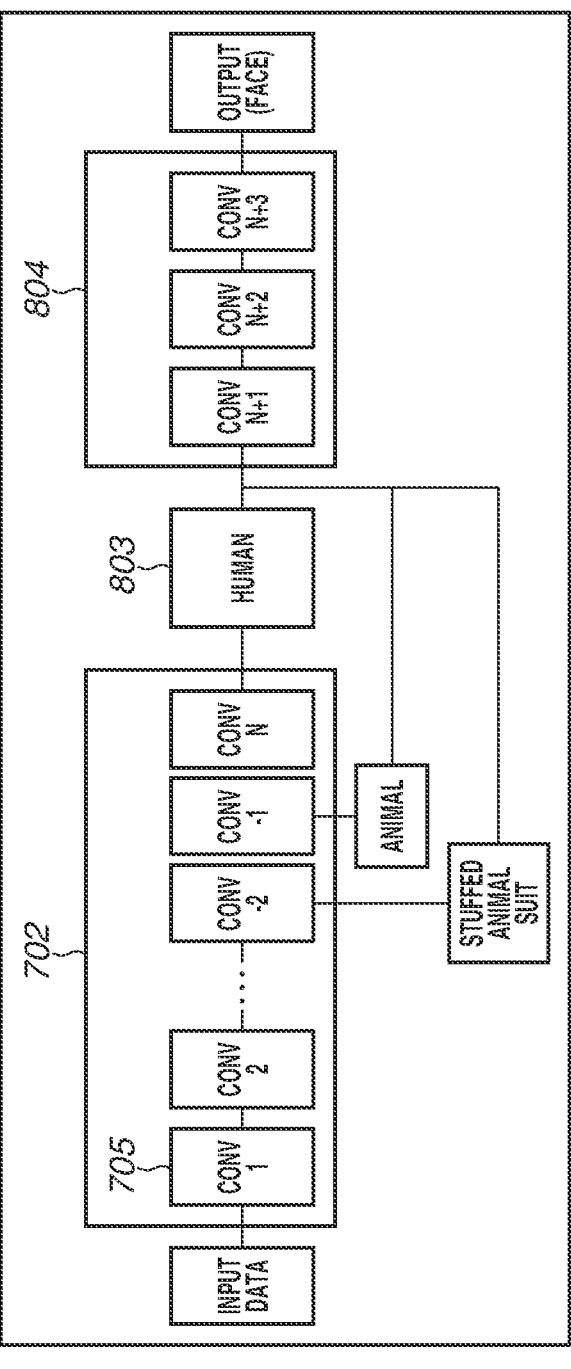

Next, as parameters required for solving the sub task to be added, a parameter connecting a predetermined intermediate layer between the sub task obtaining unit 703 and the integration unit 704, and a parameter connecting a predetermined intermediate layer between the sub task obtaining unit 703 and the intermediate representation unit 702 are added. Then, the added parameters are stored in the parameter storage unit 201. The added parameters are each initialized by a random number. Through this processing, the configuration of the neural network 601 can be changed to that of the neural network 602. In addition, in the present exemplary embodiment, the description is given of the example in which a unit for solving the recognition task to be added is added in parallel with a unit for solving the trained sub task, but each unit for solving the sub task to be newly added may be added to any intermediate layer as illustrated in FIG. 6E.

Next, in step S405, the learning unit 205 updates the parameters stored in the parameter storage unit 201. Hereinbelow, with reference to a flowchart in FIG. 5, and FIGS. 7A to 7D, an example of the processing flow will be described.

Figure 5:
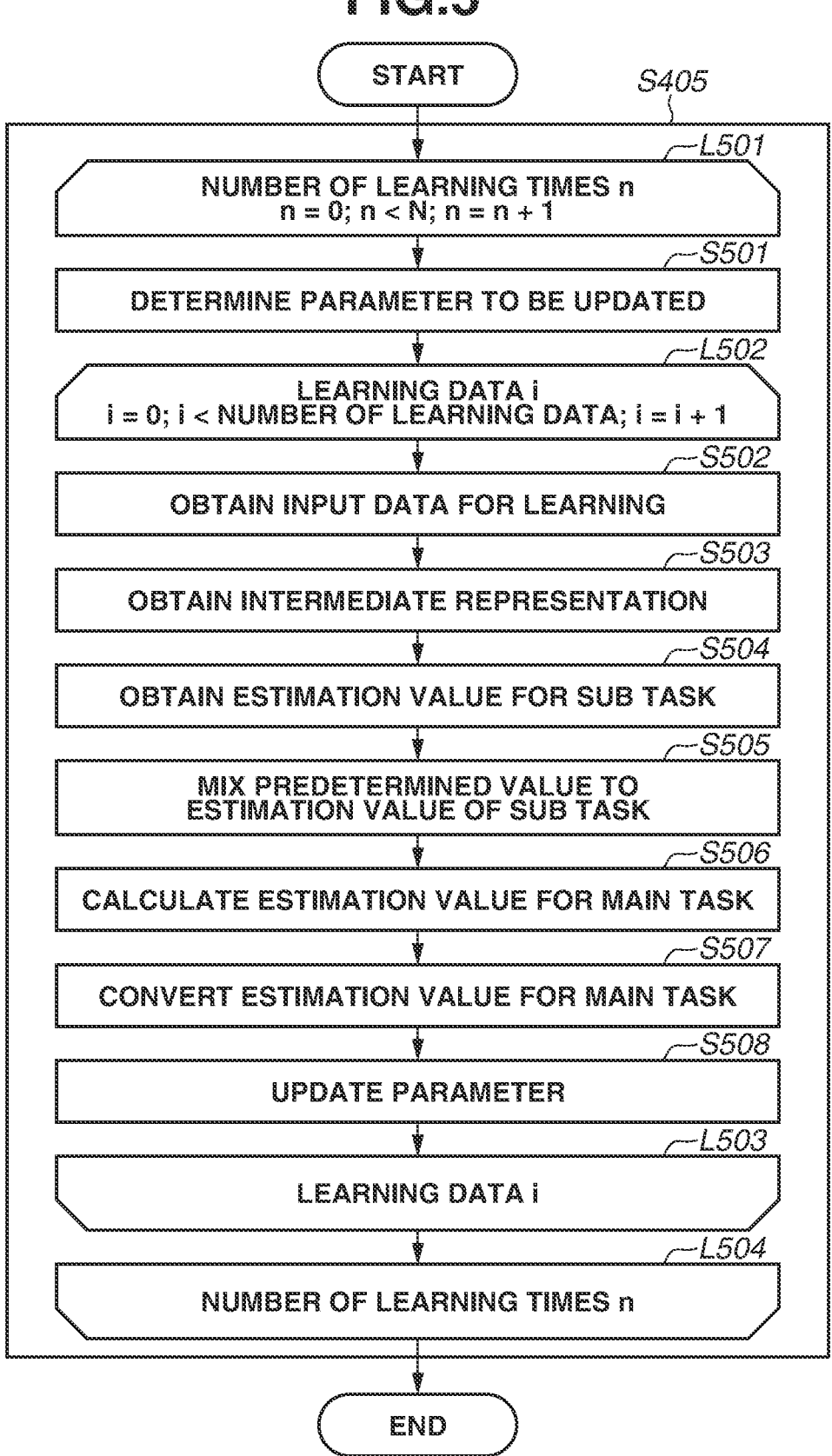
FIG. 5 is a flowchart illustrating an example of a processing procedure at a learning time according to the first exemplary embodiment.
Figures 7C, 7D:
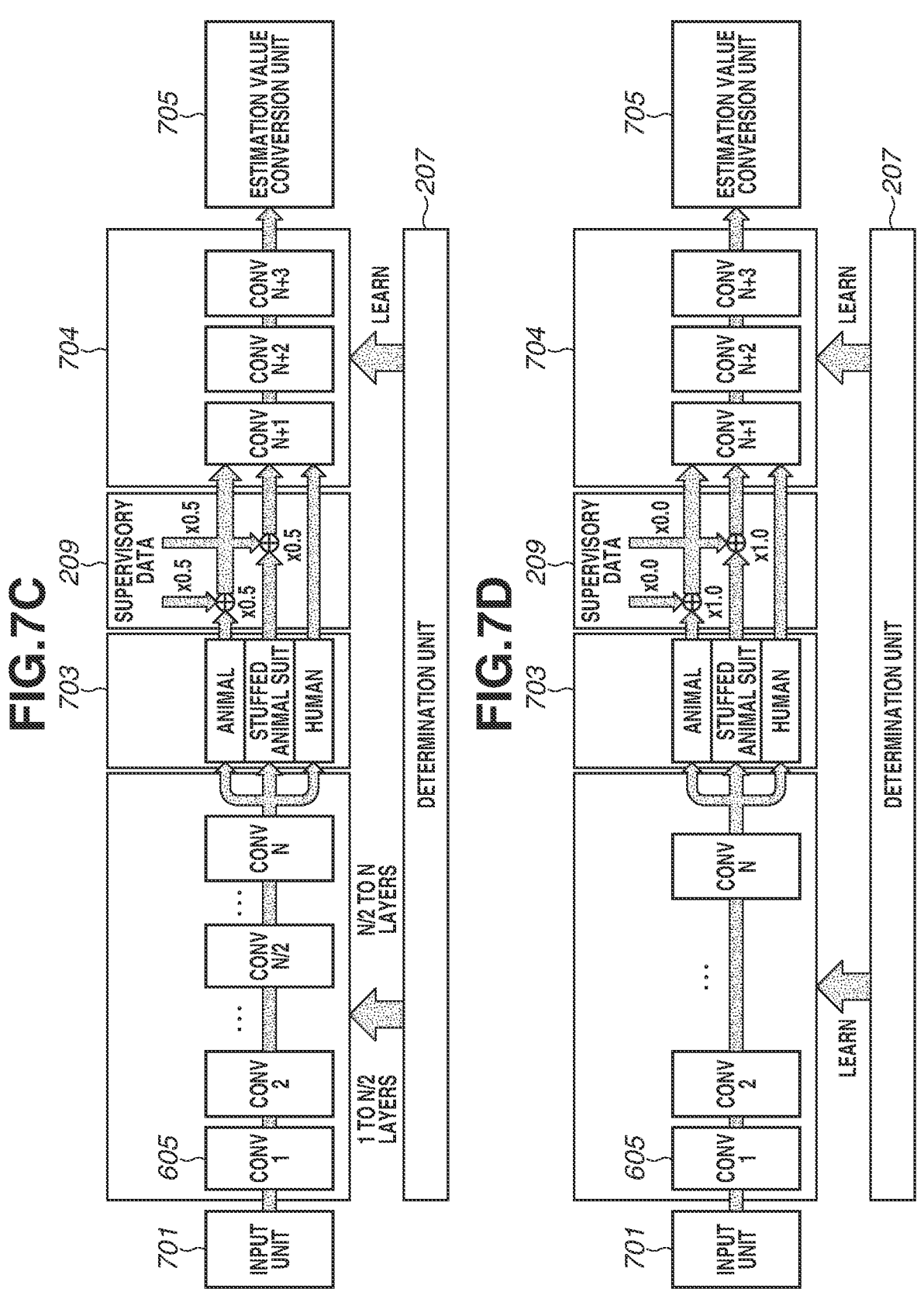

FIG. 5 is a flowchart illustrating an example of a detailed processing procedure performed in step S405. Further, FIGS. 7B to 7D are diagrams illustrating an example of operation transitions performed by the recognition unit 212, the determination unit 207, and the mixing unit 209.

First, a series of processing from steps L501 to L504 is loop processing for the number of learning times. The learning unit 205 increments a count value by one (the number of learning times increases by one) when all the pieces of learning data held by the data storage unit 204 are trained once, and the processing from steps L501 to L504 is repeatedly executed a predetermined number of times. Hereinbelow, the learning is also referred to as a parameter update.

In step S501, the determination unit 207 determines a parameter to be updated stored in the parameter storage unit 201 by the update unit 206. A user needs to set a reference value used to determine the update target parameters.

In the present exemplary embodiment, a parameter β that varies in conjunction with the number of learning times is used, to determine the update target parameter. The initial value of the parameter β is set to "1.0", and as the number of learning times increases by "1,000", the value of the parameter β decreases by "0.1". Assume that the update target parameters are a parameter concerning each of the layers from a layer for solving the sub task being as a starting point to a layer a certain number, corresponding to a value obtained by converting the $N_{train}$ value obtained based on a following equation (1) into an integer value in an input direction, away therefrom, and a parameter concerning each of all layers after the layer for solving the sub task. In addition, N in the equation (1) represents the number of convolution layers of the intermediate representation unit 702.

$$N_{train}=N\times(1.0-\beta) \tag{1}$$

With the above-described processing, it is possible to increase the number of layers to be updated, from the layer to solve the added recognition task as a starting point toward a low-dimensional side, as the number of learning times increases.

Hereinbelow, with reference to FIGS. 7A to 7D, a specific example of update target parameter determination processing will be described.

FIG. 7B is a diagram illustrating parameter determination processing performed immediately after the addition unit 203 adds a sub task. FIG. 7C is a diagram illustrating parameter determination processing performed immediately after each piece of learning data is trained "5,000" times, and FIG. 7D is a diagram illustrating parameter determination processing performed immediately after each piece of learning data is trained "10,000" times or more, each from the state in FIG. 7B.

In the state in FIG. 7B in which the number of learning times is "0", since the value of the parameter β is "1.0", the value of $N_{train}$ determined based on the equation (1) is "0". Accordingly, the parameters for "0" layers toward the input direction with the layer for solving the sub task in step S501 as a starting point, and the parameters concerning the layers after the layer for solving the sub task are updated by the learning. In other words, the determination unit 207 determines only the parameters for the layers after the layer for solving the sub task to be updated. The parameters for the layers in the integration unit 704 are update targets by the learning, and the parameters for the layers in the intermediate representation unit 702 are fixed.

In the state in FIG. 7C in which the number of times of learning is "5,000", since the value of parameter β is "0.5", the value $N_{train}$ determined based on the equation (1) is "N/2". Accordingly, the parameters concerning layers corresponding to "N/2" layers in the input direction with the layer for solving the sub task in step S501 as a starting point and the parameters concerning the layers after the layer for solving the sub task are the update targets.

Further, in the state in FIG. 7D in which the number of learning times is "10,000" or more, since the value of the parameter R is "0", the value $N_{train}$ determined based on the equation (1) is "N". Accordingly, the parameters concerning layers corresponding to N layers toward the low-dimensional side (input direction) with the layer for solving the sub task in step S501 as the starting point, and the parameters concerning the layers after the layer for solving the sub task are updated. In other words, the determination unit 207 determines all the layers to be the update target parameters.

By extending the range of layers to be updated sequentially toward the low-dimensional side with the layer for estimating the added sub task as the starting point, and using the trained intermediate representations of the low-dimensional layers sequentially for the learning of the high-dimensional layers, it is possible to perform learning without updating the trained intermediate representations largely compared with a case of performing learning all the layers from the beginning.

In addition, the range of the layers to be updated may be extended as the learning progresses as described above, or may be extended based on the transition of error calculated using a predetermined method. More specifically, for example, the transition of error between the supervisory data and the estimation value of the main task up to the previous learning time (n−1) calculated in step S507 described below, and the transition of error between the estimation value of the sub task calculated in step S504 described below and its supervisory data, are calculated. Then, the parameter β may be decreased by "0.1" when the prediction errors of the main task and the sub task each decrease from the immediately preceding update of the parameter β by $1/\beta^2$.

Referring back to FIG. 5, a series of processing of steps L502 to L503 is loop processing executed for each piece of the learning data. The learning unit 205 repeatedly executes the processing in steps L502 to L503 for the times corresponding to the number of pieces of learning data. In addition, the learning unit 205 may perform the processing on a plurality of pieces of the learning data at a time, or may perform the processing on all the pieces of learning data at a time.

In step S502, the input unit 701 obtains input data for the i-th learning determined in steps L502 to L503 from the data set, and outputs the obtained input data to the intermediate representation unit 702.

In step S503, as described above with reference to FIG. 6A, the intermediate representation unit 702 obtains the intermediate representation from the input data obtained by the input unit 701.

In step S504, the sub task obtaining unit 703 obtains an estimation value for each sub task, based on the intermediate representation obtained by the intermediate representation unit 702. In this case, assume that the estimation value of the sub task obtained for the learning data is $x_{est}$. In addition, the intermediate representation has a 2-dimensional map form corresponding to the input image, and whether each position corresponding to the input image is an estimation target to be estimated by the sub task is estimated as a likelihood. The intermediate representation may be converted into a map with a resolution lower than that of the input image by pooling or the like. For example, in a case where the value range of the likelihood is "0" to "1", the value "0" indicates that the possibility to be the estimation target of the sub task is low, and the value "1" indicates that the possibility to be the estimation target of the sub task is high.

In step S505, the mixing unit 209 obtains a value $x_{mix}$ that is a value obtained by mixing, to the estimation value $x_{est}$ of the sub task obtained by the sub task obtaining unit 703, a predetermined value $x_{gt}$ at an arbitrary mixing ratio α, as illustrated in an equation (2). Further, the mixing unit 209 outputs the obtained value $x_{mix}$ to the integration unit 704 as the estimation value of the sub task.

$$x_{mix}=(1-\alpha)x_{est}+\alpha \times x_{gt} \qquad (2)$$

In the equation (2), as the predetermined value $x_{gt}$, supervisory data for the added sub tasks (tasks for extracting "stuffed animal suit" region and "animal" region) is used. Alternatively, an estimation value of the sub task obtained from a model obtained by separately learning a dedicated model for solving the sub task or downloading the dedicated model may be used as the value $x_{gt}$. The change condition of the mixing ratio α can be set by a user, via the operation unit 16, who executes the learning. The mixing ratio α may be reduced as the number of learning times increases.

Now, with reference to FIGS. 7A to 7D, the change of the mixing ratio α depending on the number of learning times will be described. In the present exemplary embodiment, assume that an initial value of the mixing ratio α is set to "1.0", and the mixing ratio α is decreased by "0.1" when each of pieces of the learning data is trained "1,000" times.

At a time immediately after starting the learning, as illustrated in FIG. 7B, since the mixing ratio α is "1.0", the estimation value of the added recognition task and the supervisory data are mixed at a ratio of "0:100". In other words, in the learning initial state, the output in step S505 is the supervisory data as it is. At the learning early stage, a separation between the estimation value and the supervisory data is large. Thus, ideal supervisory data itself is output to layers after the intermediate representation even if the estimation value has any value. In this way, for the layers after the intermediate representation, the learning progresses in the ideal state of the intermediate representation. As the learning progresses, since the separation between the estimation value and the supervisory data being small can be expected, the mixing ratio of the estimation value is gradually increased, and the learning is finally performed with the estimation value.

In the state in FIG. 7C in which the number of learning times is "5,000", since the mixing ratio α is "0.5", the estimation value of the added recognition task and the supervisory data are mixed at a ratio of 50:50. Further, in the state in FIG. 7D in which the number of learning times is "10,000" or more, since the mixing ratio α is "0", the estimation value of the added recognition task and the supervisory data are mixed at a ratio of 100:0.

In this way, the mixing ratio between the estimation value of the added sub task and the supervisory data changes, depending on the number of learning times, from the state in FIG. 7B to that in FIG. 7C, and from the state in FIG. 7C to that in FIG. 7D. With this processing, it is possible to gradually increase the dependence at a learning time on the estimation value of the added sub task, and to finally obtain desired estimation values corresponding to all the sub tasks.

In addition, the mixing ratio α may be changed depending on the progress of the learning as described above, or may be changed depending on another reference. For example, the mixing ratio α may be decreased by "0.1" each time the prediction error of each of the main task and the sub task decreases by $1/\alpha^2$, using the learning data or verification data separately prepared by a user. Further, the same value as the parameter β described above in step S501 may be used as the mixing ratio α.

Referring back to FIG. 5, in step S506, the integration unit 704 calculates the estimation value for the main task based on the value obtained in step S505, and outputs the calculated estimation value for the main task to the estimation value conversion unit 705.

In step S507, the estimation value conversion unit 705 converts the estimation value for the main task calculated by the integration unit 704 into that in a predetermined format, and outputs the converted estimation value to the output unit 213, as the estimation result for the main task.

In step S508, the update unit 206 updates the parameters to be updated determined by the determination unit 207 based on the estimated errors of the sub task and the main task using an error back propagation method. In addition, the update method of the parameters is not limited to the error back propagation method, and another method may be used.

Referring back to FIGS. 4A and 4B, in step S406, the update unit 206 evaluates the performance of the trained model.

More specifically, first, the inference unit 208 outputs the estimation result with respect to the main task, based on the parameters for the trained model stored in the parameter storage unit 201. The update unit 206 evaluates the performance of the trained model using a predetermined method, based on the estimation result of the inference unit 208 and the supervisory data stored in the data storage unit 204.

The predetermined method may be a method of using a confusion matrix or a mean squared error. Alternatively, the predetermined method may be a method uniquely determined by an evaluator.

In step S407, the update unit 206 determines whether to continue the learning. More specifically, the update unit 206 determines whether the result of the evaluation in step S406 satisfies a predetermined reference value. In a case where the result of the evaluation does not satisfy the predetermined reference value (NO in step S407), the update unit 206 determines to continue the learning, and returns the processing to step S402. On the other hand, in a case where the result of the evaluation satisfies the predetermined reference value (YES in step S407), the update unit 206 determines not to continue the learning, and ends the processing of the flowchart in FIG. 4A.

In the present exemplary embodiment, the recognition task to be solved by the model and the recognition task to be added are each set to the region division task, but the present disclosure is not limited to the region division task, and can be applied to a recognition task to be solved generally by the machine learning. For example, the present disclosure may be applied to a classification task, a regression task, or a detection task. Further, the combination of the recognition task to be solved by the model and the recognition task to be added may be the same recognition task, or different recognition tasks. For example, the recognition task to be solved by the model may be set as a "scene recognition", and the recognition task to be added may be set to an "object detection".

Further, in the present exemplary embodiment, the region division task is set to each of the recognition task to be solved by the model in the middle and the main task, but the present disclosure can be applied to a case where the recognition tasks are the same or different. Further, in the present exemplary embodiment, the description is given of the example of adding the recognition task as a sub task to be added different from the main task, but the present disclosure may use, as the sub task to be added, the same recognition task as the main task. Further, in the present exemplary embodiment, the description is given of the case where the data input to the model is an image, but the input data format to which the present disclosure is applicable is not limited to the image.

Further, in the present exemplary embodiment, the model that outputs only the estimation result of the recognition task set in advance in the intermediate layer is trained, but the present disclosure is also applicable to a model including units learning the intermediate representation in parallel without the supervisory data being explicitly given.

As described above, according to the present exemplary embodiment, in the case of adding a task to be solved by a model using the parameters of the trained model, the mixing ratio $\alpha$ is changed depending on the number of learning times, and the dependence on the estimation value of the added sub task at the learning time is gradually increased. In this way, the model can be trained without largely updating at an early stage the feature amount trained by the trained model.

In the first exemplary embodiment, the description is given of the learning method of the model that integrates the estimation values of the one or more sub tasks in the learning apparatus, and outputs the estimation result of the main task, but the configuration of the learning apparatus to which the present disclosure is applicable is not limited to the configuration in which the estimation values of the one or more sub tasks are integrated in the learning apparatus.

In a second exemplary embodiment, a description will be given of a model that outputs, as a final estimation result of a main task, a value obtained by performing a simple calculation on estimation values of the main task and a sub task for solving the main task.

In addition, in the present exemplary embodiment, a description will be given of processing of adding, as a sub task, a task of extracting regions other than a "face" region to suppress a case where a trained model for estimating the "face" region estimates the regions other than the "face" region to be a "face" region. Further, in the present exemplary embodiment, in a case where an estimation value of a task for extracting regions other than the "face" region is higher than a threshold value, the estimation value of the "face" region is changed, and the changed estimation value of the "face" region is output as an estimation result to train the model.

In addition, in the present exemplary embodiment described below, descriptions of duplicate portions with the first exemplary embodiment will be omitted, and only different portions will be described.

First, with reference to FIGS. 6C and 6D, the recognition unit 212 of the learning apparatus 200 according to the present exemplary embodiment will be described in detail. FIG. 6C is a diagram illustrating an example of a neural network defined by the parameters obtained by the CPU 11 in step S401, and FIG. 6D is a diagram illustrating an example of the neural network after a sub task is added by the addition unit 203 in step S404.

First, the recognition unit 212 receives, as input data, data obtained by the obtaining unit 211, and solves a recognition task of extracting a "face" region, which is a main task, using the convolution layers 605 including N layers. Each of the convolution layers 605 executes convolution processing, pooling processing, and normalization processing. The sub task obtaining unit 703 receives the data obtained by the obtaining unit 211 as input data, and solves a recognition task of extracting a "face" region (main task), and recognition tasks (sub tasks) of extracting an "animal" region and a "stuffed animal suit" region by the convolution layers 605 including N layers. Then, in a case where the estimation value of the recognition task of extracting the regions other than the "face" region is higher than the threshold value, the sub task obtaining unit 703 lowers and outputs the estimation value of the "face" region, and solves the recognition task of extracting the "face" region (main task).

Next, with reference to a flowchart in FIG. 4B, an example of a processing procedure of the learning apparatus 200 according to the present exemplary embodiment will be described.

The processing performed in steps S401 and S402 are similar to that according to the first exemplary embodiment, and descriptions thereof are omitted.

In step S404, the addition unit 203 adds, as parameters concerning the sub tasks, parameters for solving extraction tasks of the "stuffed animal suit" region, and the "animal" region in parallel with the parameters required for solving the "face" region extraction task (main task), and stores the parameters in the parameter storage unit 201. Further, the addition unit 203 adds parameters (hereinbelow, also referred to as parameters for the integration unit 704) for connecting with the integration unit 704 units for solving the main task and the sub task, and stores the parameters in the parameter storage unit 201.

In the present exemplary embodiment, in order for the integration unit 704 to compare the estimation value of the sub task and a threshold value θ in the processing described below, the addition unit 203 adds the threshold value θ as a parameter for the integration unit 704, and stores the threshold value θ in the parameter storage unit 201.

In step S405, the learning unit 205 updates the parameters stored in the parameter storage unit 201. With reference to a flowchart in FIG. 5, the processing performed in step S405 will be described below in detail.

The processing performed in steps S501 to S505 is similar to that in the first exemplary embodiment, and descriptions thereof are omitted.

In step S506, the integration unit 704 obtains the estimation value for the main task based on the estimation value of the sub task obtained by the processing in step S505, and the parameters stored in the parameter storage unit 201 in step S404. For example, in a case where a posterior probability (estimation value) of the sub task for extracting the regions other than the "face" region is the threshold value θ or more, the integration unit 704 replaces the posterior probability of the main task with "0.0".

Here, with reference to FIGS. 8A to 8C, a specific example of the processing performed in step S506 will be described. FIG. 8A is a diagram illustrating an example of an input image obtained by the obtaining unit 211, and FIG. 8B is a diagram illustrating an example of estimation values of the sub tasks obtained by the processing in step S505. Further, FIG. 8C is a diagram illustrating an example of an estimation value of the "face" region extraction task (main task) obtained in step S506.

An input image 801 in FIG. 8A is a recognition target image. An image 802 in FIG. 8B illustrates "face" regions and posterior probabilities thereof as an estimation result of the extraction task of the "face" region. Images 803 and 804 are images indicating an "animal" region and a "stuffed animal suit" region, and posterior probabilities thereof, as estimation values of the extraction tasks of the "animal" region and the "stuffed animal suit" region, respectively.

In the image 802, the posterior probability of the "face" region located on the left side is "0.8", and the posterior probability of the "face" region located on the right side is "0.2". Further, in the image 803, the posterior probability of the "animal" region located on the right side is "0.9".

In this example, if the threshold value θ is set to "0.5", since the posterior probability 0.9 of the "animal" region in the image 803 is the threshold value θ or more, the integration unit 704 replaces the posterior probability of the "face" region on the right side in the image 802 with "0.0". As a result, an image 805 is obtained because the face in this area is regarded as not detected.

In generalizing the processing, the posterior probability $x_{out}$ of the main task obtained by the integration unit 704 is expressed by a following equation (3) using a posterior probability $x_{sub}$ of a sub task and a threshold value θ. In the equation (3), $x_{main}$ is a posterior probability of a main task obtained based on the posterior probability of the sub task.

$$x_{out} = \begin{cases} x_{main} & \text{if } \max(x_{sub}) < \theta \\ 0.0 & \text{if } \max(x_{sub}) \geq \theta \end{cases} \qquad (3)$$

In step S507, the estimation value conversion unit 705 outputs the calculation result obtained in step S506, as an estimation result. In the example described above, the output like the image 805 in FIG. 8C is obtained as the estimation result of the "face" region extraction task.

Processing performed in steps S508, S406, and S407 is similar to that in the first exemplary embodiment, and descriptions thereof are omitted.

According to the present exemplary embodiment described above, the present disclosure is applicable without largely depending on the configuration of the trained model.

In addition, in the present exemplary embodiment, the excessive detection case of the main task is described, but the processing is applicable to an undetected case. In this case, the integration unit 704 only needs to set, for example, a value obtained by adding the estimation value for the sub task and the estimation value for the main task in the undetected case as a final estimation result.

Further, the parameter for the integration unit 704 to be stored in the parameter storage unit 201 by the addition unit 203 in step S404 is not limited to the threshold value θ used for comparison with the estimation value of the sub task. For example, a weight $w_c$ for connecting the unit for solving the sub task and the unit for solving the main task that is finally output, and a bias "b" may be stored as parameters for the integration unit 704. In this case, in step S506, the integration unit 704 may obtain the posterior probability $x_{out}$ of the main task from the posterior probability $x_c$ of the sub task based on a following equation (4).

$$x_{out} = \Sigma_C x_C \times w_C + b \qquad (4)$$

In the first exemplary embodiment, the description is given of the example in which the user prepares the supervisory data corresponding to each recognition task to be solved by the model when the data set used for the learning is created. However, it is difficult to prepare many images each of which is provided with the supervisory data corresponding to the sub task added by the addition unit 203 described in the first exemplary embodiment.

Thus, in a third exemplary embodiment, a description will be given of a method (so-called distillation method) of using an output result of a trained model as supervisory data for a recognition task to be added. By performing the method described in the present exemplary embodiment, human resources required for providing the learning data can be reduced.

Hereinbelow, with reference to FIGS. 9A and 9B, a description will be given of an example of generating, based on the output of a predetermined trained model, learning data used for the learning. In addition, in the present exemplary embodiment, assume that the sub task to be added is an extraction task of an "animal" region.

Figure 9A:
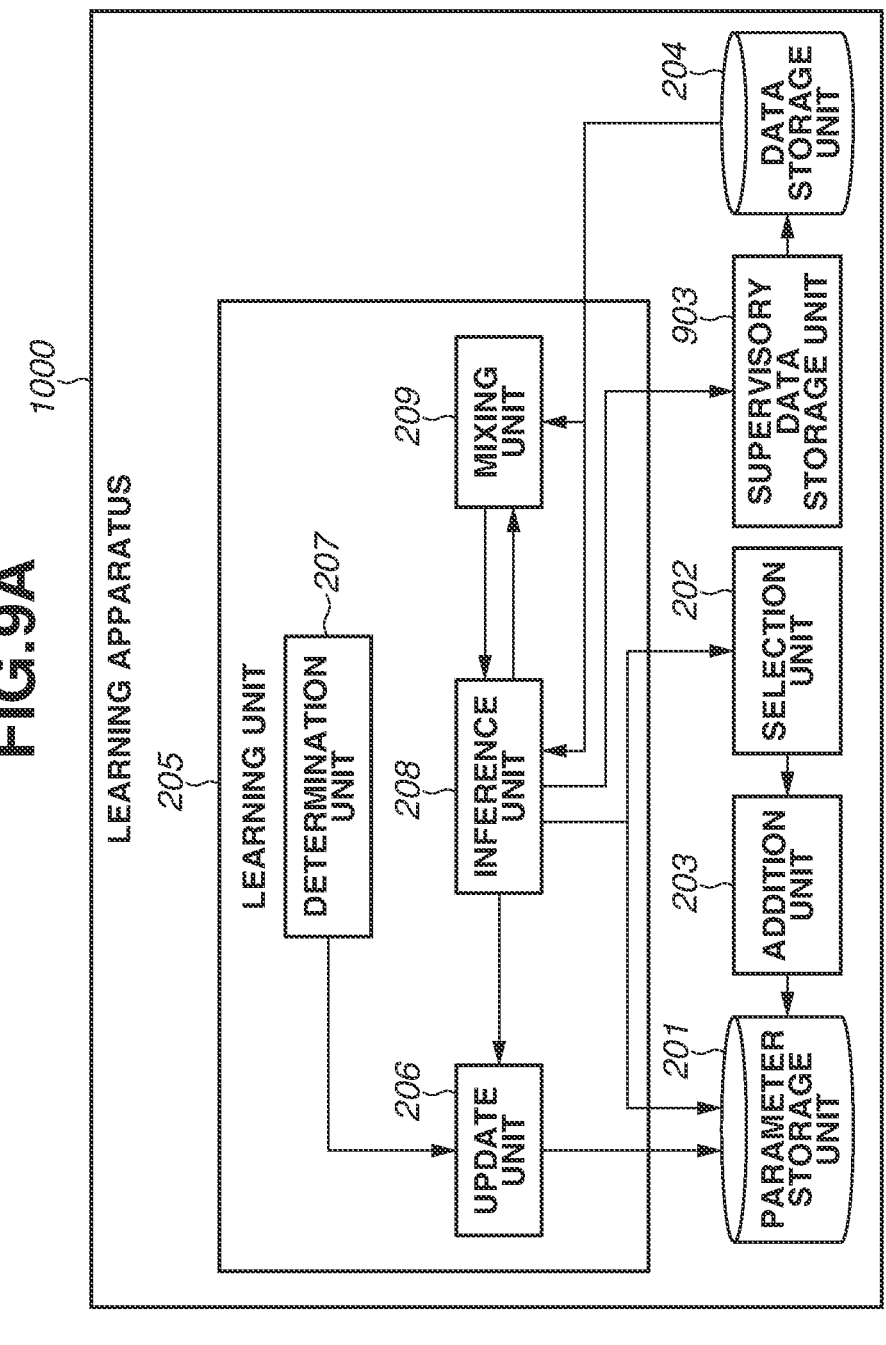

FIG. 9A is a block diagram illustrating an example of a functional configuration for dynamically obtaining the supervisory data in a learning apparatus 1000. Further, FIG. 9B is a diagram illustrating processing for preliminarily obtaining the supervisory data.

Further, in the present exemplary embodiment, with reference to FIG. 9B, a supervisory data storage unit 903 that is a difference from the learning apparatus 200 according to the first exemplary embodiment will be described, and duplicate portions with the first exemplary embodiment are not described.

First, in order to generate supervisory data, the obtaining unit 211 outputs the input data 301 from the data storage unit 204 to the recognition unit 212. The recognition unit 212 obtains, from the parameter storage unit 201, the parameters concerning the neural network trained to solve, as a main task, a recognition task to be added as a sub task by the addition unit 203, and performs recognition processing on the input data 301. Then, the recognition unit 212 outputs an estimation result 902 for the sub task to the output unit 213.

Then, the output unit 213 obtains the estimation result 902 concerning the sub task added by the addition unit 203. At the end, the supervisory data storage unit 903 stores, in the data storage unit 204, the estimation result 902 for the sub task obtained from a recognition apparatus 210 as the supervisory data corresponding to the input data 301.

In addition, the posterior probability (so-called soft target) at an inference time may be directly used as a value to be stored as supervisory data, as discussed in "G. Hinton, O. Vinyals, J. Dean, Distillation the Knowledge in a Neural Network, Neural Information Processing Systems, 2014.", or a binarized value, which is obtained by binarizing the estimation result for the sub task obtained from the recognition apparatus 210 using a preliminarily set threshold value may be used.

By performing this processing on all the pieces of input data stored in the data storage unit 204, the learning apparatus 1000 can generate the data set to be used for the learning using the output result of the trained recognition apparatus 210.

In addition, the processing of obtaining the supervisory data for the sub task to be added by the addition unit 203 based on the trained parameters may be preliminarily performed on all the learning data before the learning apparatus 1000 performs the learning processing, or may be sequentially performed when the learning is performed.

As described above, according to the present exemplary embodiment, human resources required for obtaining the supervisory data can be reduced when the method described in the first exemplary embodiment is performed.

In the first exemplary embodiment, the description is given of the example in which the user preliminarily set the recognition tasks to be added. However, the recognition tasks to be added can be selected and set by the learning apparatus. In a fourth exemplary embodiment, a description will be given of a method of selecting a recognition task to be added based on the output result of the trained model or the supervisory data manually input.

In addition, in the present exemplary embodiment, in a case where a main task is solved using a trained model, the model is trained to reduce the excessive detection when many excessive detection cases are present in the estimation result.

FIG. 4B is a flowchart illustrating an example of a processing procedure of the learning apparatus 200 according to the present exemplary embodiment. The present exemplary embodiment is different in the processing procedure from the first exemplary embodiment in that processing in step S403 for automatically selecting a recognition task to be added is executed, instead of manually selecting a sub task to be added performed in step S402. In addition, the processing in steps S401, and S404 to S407 other than step S403, is similar to that in the first exemplary embodiment, and a description thereof is omitted.

In step S403, the selection unit 202 obtains predetermined values of a recognition result of the main task based on the trained parameters for the input data, a recognition result based on the parameters that has trained the sub task of an addition candidate, and the supervisory data for the addition candidate of the sub task. Then, the selection unit 202 compares the obtained predetermined values to select a recognition task to be added based on the comparison result.

More specifically, the selection unit 202 calculates common regions each between the estimation result of the model that has trained a recognition task of the addition candidate as a sub task, and the excessive detection region of the main task, to select a recognition task with a large area of the common region as a sub task to be added. In addition, in the present exemplary embodiment, in a case where the supervisory data for the recognition task to be added is obtained using the method in the third exemplary embodiment, the recognition task to be added is set based on the output of the trained model, but the present disclosure is applicable to a case where the supervisory data for the recognition task other than the recognition task of the trained model is provided to the learning data.

Figure 10:
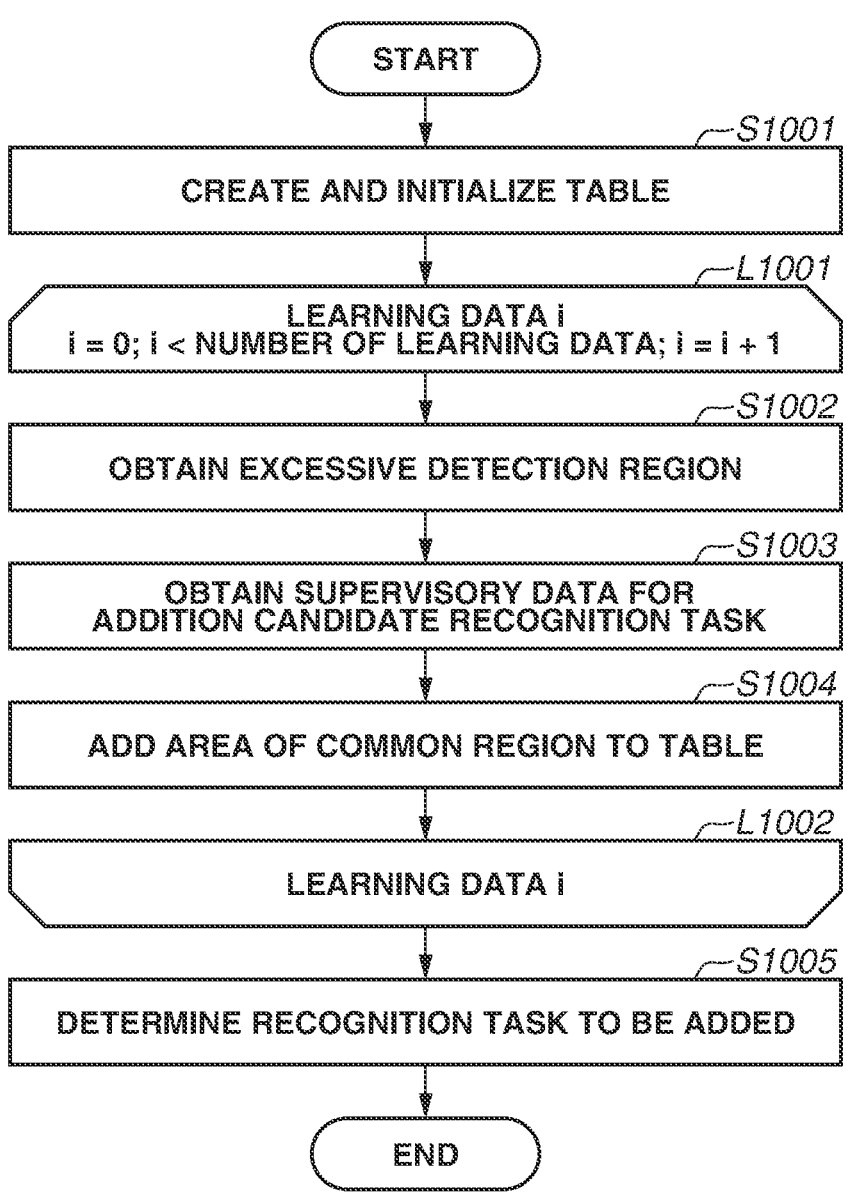
FIG. 10 is a flowchart illustrating an example of a processing procedure for selecting a recognition task to be added, according to the fourth exemplary embodiment.

Hereinbelow, with reference to a flowchart in FIG. 10, the processing performed in step S403 will be described in detail.

In step S1001, the selection unit 202 creates a table for holding an area of a region (common region) at which the supervisory data for a recognition task of an addition candidate and the excessive detection region of the trained model overlap each other, and initializes the table.

A series of processing in steps L1001 to L1002 is loop processing executed for each piece of the learning data. The learning unit 205 repeatedly executes the processing in steps L1001 to L1002 number of times as the number of pieces of the learning data in a data set. In addition, the data used in the present exemplary embodiment may be learning data, or may be data preliminarily created by a user other than the learning data.

In step S1002, the inference unit 208 performs estimation processing using parameters of the trained model stored in the parameter storage unit 201. Then, the selection unit 202 obtains an excessive detection region in the output of the trained model, based on the estimation result of the inference unit 208.

In step S1003, the selection unit 202 obtains the supervisory data for the recognition task of an addition candidate through the processing by the inference unit 208 of the model that has trained the recognition task of the addition candidate.

In step S1004, the selection unit 202 adds the area of the common region between the excessive detection region and the supervisory data respectively obtained in steps S1002 and S1003 to a value of the table created in step S1001. At last, in step S1005, the selection unit 202 determines arbitrary number of recognition tasks as the recognition tasks to be added, in descending order of the area of the common region.

In addition, in the present exemplary embodiment, since each of the main task and the recognition task of the addition candidate is set to be a region division task, the method of determining the recognition task to be added based on the area of the region is described. However, the task to which the present disclosure is applicable is not limited to the region division task. For example, in a case of an identification task, a degree of similarity between the estimation result of the trained model and the supervisory data may be used.

Further, in the present exemplary embodiment, the example in which each of the main task and the recognition task to be added is the region division task is described. However, the present disclosure is applicable to a case where the trained model solves an identification task, and the recognition task to be added solves a region division task. For example, the recognition task to be added may be determined, based on a product of a posterior probability of a case of a false recognition by the trained model, and an area ratio of the supervisory data.

Further, in the present exemplary embodiment, in the trained model, an example of adding a recognition task to reduce the excessive detection cases for the main task is described. However, as described above in the first exemplary embodiment, the effects can be similarly expected for the case of adding the recognition tasks of undetected cases or with the inclusion relationship.

The present disclosure effectively functions when the accuracy of the model for solving the recognition task of the addition candidate is high. This is because the supervisory data for the recognition task to be added becomes data with a high consistency, and the feature amount characteristic of the recognition task to be added can be trained. Further, as the model for solving the recognition task of the addition candidate, a model for solving many recognition tasks may be used, or a plurality of models each for solving a single recognition task may be used.

As described above, according to the present exemplary embodiment, by selecting a recognition task to be added, it is possible to train a model rapidly and efficiently.

Other Exemplary Embodiments

The present disclosure can be realized by processing of supplying a program for implementing one or more functions of the above-described exemplary embodiments to a system or an apparatus via a network or a storage medium, and one or more processors in the system or the apparatus reading and executing the program. Further, the present disclosure can also be realized by a circuit (e.g., application specific integrated circuit (ASIC)) that can implement one or more functions.

The disclosure of the exemplary embodiments includes following configurations, a method, and a storage medium.
<Configuration 1>
A learning apparatus, comprising:
a memory storing instructions; and
a processor that, upon execution of the stored instructions, is configured to operate as:
an addition unit configured to add a task to a trained model having a hierarchical configuration;
a mixing unit configured to mix at a predetermined mixing ratio an estimation value for the added task, and supervisory data for the added task or a predetermined value obtained from data generated based on the trained model; and
an update unit configured to update a parameter of the trained model using an estimation value in which the predetermined value is mixed by the mixing unit.
<Configuration 2>
The learning apparatus according to the configuration 1, wherein the mixing unit changes the predetermined mixing ratio based on training progress.
<Configuration 3>
The learning apparatus according to the configuration 1 or 2, further comprising a determination unit configured to determine which layer is to be updated with the parameter.
<Configuration 4>
The learning apparatus according to the configuration 3, wherein the determination unit determines the layer to be updated based on training progress.
<Configuration 5>
The learning apparatus according to the configuration 4, wherein, based on the training progress, the determination unit increases the layer to be updated toward a low-dimensional side with a layer for solving the added task as a starting point.

<Configuration 6>
The learning apparatus according to any one of the configurations 1 to 5, wherein the addition unit adds a task selected by a user's operation.
<Configuration 7>
The learning apparatus according to any one of the configurations 1 to 5, wherein the addition unit adds a task selected based on a comparison between an output of the trained model and the predetermined value.
<Configuration 8>
The learning apparatus according to any one of the configurations 1 to 5, wherein the task to be added is a task different from a main task of the trained model.
<Configuration 9>
The learning apparatus according to any one of the configurations 1 to 5, wherein the task to be added includes a same task as a main task of the trained model.
<Configuration 10>
A recognition apparatus configured to perform a recognition task using a trained model where a parameter is updated by a learning apparatus, the learning apparatus comprising:
a memory storing instructions; and
a processor that, upon execution of the stored instructions, is configured to operate as:
an addition unit configured to add a task to a trained model having a hierarchical configuration;
a mixing unit configured to mix at a predetermined mixing ratio an estimation value for the added task, and supervisory data for the added task or a predetermined value obtained from data generated based on the trained model;
an update unit configured to update a parameter of the trained model using an estimation value in which the predetermined value is mixed by the mixing unit, and
the recognition apparatus comprising a recognition unit configured to perform a recognition task using the trained model having the updated parameter.
<Method 1>
A learning method, comprising:
adding a task to a trained model having a hierarchical configuration;
mixing at a predetermined mixing ratio an estimation value for the added task, and supervisory data for the added task or a predetermined value obtained from data generated based on the trained model; and
updating a parameter of the trained model using an estimation value in which the predetermined value is mixed by the mixing.
A non-transitory computer-readable storage medium storing a computer-executable instructions that, when executed by a computer, cause the computer to perform a method comprising:
adding a task to a trained model having a hierarchical configuration;
mixing, at a predetermined mixing ratio, an estimation value for the added task, and supervisory data for the added task or a predetermined value obtained from data generated based on the trained model; and
updating a parameter of the trained model using an estimation value in which the predetermined value is mixed by the mixing.
According to the present disclosure, it is possible to accurately update the parameters of the trained model.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-066963, filed Apr. 14, 2022, which is hereby incorporated by reference herein in its entirety.

What is claimed is:

1. A learning apparatus, comprising:
a memory storing instructions; and
a processor that, upon execution of the stored instructions, is configured to operate as:
an addition unit configured to add a task to a trained model having a hierarchical configuration, wherein the addition unit adds the task based on a comparison between an output of the trained model and a predetermined value;
a mixing unit configured to mix, at a predetermined mixing ratio, an estimation value for the added task, and supervisory data for the added task or a predetermined value obtained from data generated based on the trained model; and
an update unit configured to update a parameter of the trained model using an estimation value in which the predetermined value is mixed by the mixing unit.

2. The learning apparatus according to claim 1, wherein the mixing unit changes the predetermined mixing ratio based on training progress.

3. The learning apparatus according to claim 1, further comprising a determination unit configured to determine which layer is to be updated with the parameter.

4. The learning apparatus according to claim 3, wherein the determination unit determines the layer to be updated based on training progress.

5. The learning apparatus according to claim 4, wherein, based on the training progress, the determination unit increases the layer to be updated toward a low-dimensional side with a layer for solving the added task as a starting point.

6. The learning apparatus according to claim 1, wherein the addition unit adds a task selected by a user's operation.

7. The learning apparatus according to claim 1, wherein the task to be added is a task different from a main task of the trained model.

8. The learning apparatus according to claim 1, wherein the task to be added includes a same task as a main task of the trained model.

9. A recognition apparatus configured to perform a recognition task using a trained model where a parameter is updated by a learning apparatus, the learning apparatus comprising:
a memory storing instructions; and
a processor that, upon execution of the stored instructions, is configured to operate as:
an addition unit configured to add a task to a trained model having a hierarchical configuration, wherein the addition unit adds the task based on a comparison between an output of the trained model and a predetermined value;
a mixing unit configured to mix, at a predetermined mixing ratio, an estimation value for the added task, and supervisory data for the added task or a predetermined value obtained from data generated based on the trained model; and
an update unit configured to update a parameter of the trained model using an estimation value in which the predetermined value is mixed by the mixing unit, and
the recognition apparatus comprising a recognition unit configured to perform a recognition task using the trained model having the updated parameter.

10. A learning method, comprising:
adding a task to a trained model having a hierarchical configuration based on a comparison between an output of the trained model and a predetermined value;
mixing, at a predetermined mixing ratio, an estimation value for the added task, and supervisory data for the added task or a predetermined value obtained from data generated based on the trained model; and
updating a parameter of the trained model using an estimation value in which the predetermined value is mixed by the mixing.

11. A non-transitory computer-readable storage medium storing a computer-executable instructions that, when executed by a computer, cause the computer to perform a method comprising:
adding a task to a trained model having a hierarchical configuration based on a comparison between an output of the trained model and a predetermined value;
mixing, at a predetermined mixing ratio, an estimation value for the added task, and supervisory data for the added task or a predetermined value obtained from data generated based on the trained model; and
updating a parameter of the trained model using an estimation value in which the predetermined value is mixed by the mixing.

* * * * *